United States Patent
Bova et al.

[19]

[11] Patent Number: 5,845,599
[45] Date of Patent: Dec. 8, 1998

[54] VACUUM CONTROLLER AND METHOD OF CONTROLLING VACUUM IN A DAIRY MILKING SYSTEMS

[75] Inventors: G. Frederick Bova, Pittsford; David J. Dunn, Rutland; James J. Allen, Ira, all of Vt.

[73] Assignee: SmartEnergy Services, Inc., Rutland, Vt.

[21] Appl. No.: 797,432

[22] Filed: Feb. 10, 1997

[51] Int. Cl.$^6$ ...................................................... A01J 5/007
[52] U.S. Cl. ............................................................ 119/14.08
[58] Field of Search ............................ 119/14.01, 14.02, 119/14.03, 14.08, 14.18, 14.25, 14.43, 14.44

[56] References Cited

U.S. PATENT DOCUMENTS

| | | | |
|---|---|---|---|
| 3,783,837 | 1/1974 | Olander | 119/14.08 |
| 4,605,040 | 8/1986 | Meermoller | 137/489 |
| 4,616,215 | 10/1986 | Maddalena | 340/626 |
| 4,664,601 | 5/1987 | Uchida et al. | 417/27 |
| 5,141,403 | 8/1992 | Guo et al. | 119/14.44 |
| 5,284,180 | 2/1994 | Guo et al. | 119/14.44 |
| 5,568,788 | 10/1996 | van den Berg et al. | 119/14.02 |

OTHER PUBLICATIONS

David C. Ludington, et al, "Vacuum Pumps: Types and Controls," Design Modern Milking Center Conference, Dec. 1995, pp. 231, 234 and 235.

Roger Pellerin et al., "Energy Saving Experimental Vacuum Milking System," Agricultural Demand–Side Management Conference, Oct. 23 and 24, 1990, pp. 1–3.

David C. Ludington, et al., "Vacuum Technology and Energy Consideration," Milking Center Design Conference, Nov. 1992, pp. 290–292, and 296.

David C. Ludington, et al., "New electric Technologies for the Dairy Farm," Nat'l Food & Energy Council Annual Mtg., Jul. 31 and Aug. 1, 1995, pp. 3–6.

*Primary Examiner*—Thomas Price
*Attorney, Agent, or Firm*—Downs Rachlin & Martin, PLLC

[57] ABSTRACT

A control system for a vacuum milking system, and a method of controlling vacuum in such milking system. The system comprises an electric vacuum pump motor, a vacuum transducer for providing an output signal that varies as a function of changes in vacuum in the milking line and a variable frequency drive (VFD) connected to the vacuum pump motor and the transducer for controlling the speed of the motor. The VFD varies the frequency of the power signal it provides to the motor as a function of deviation between the output signal from the transducer, which the VFD is programmed to recognize as representative of vacuum, and a setpoint representative of vacuum.

15 Claims, 1 Drawing Sheet

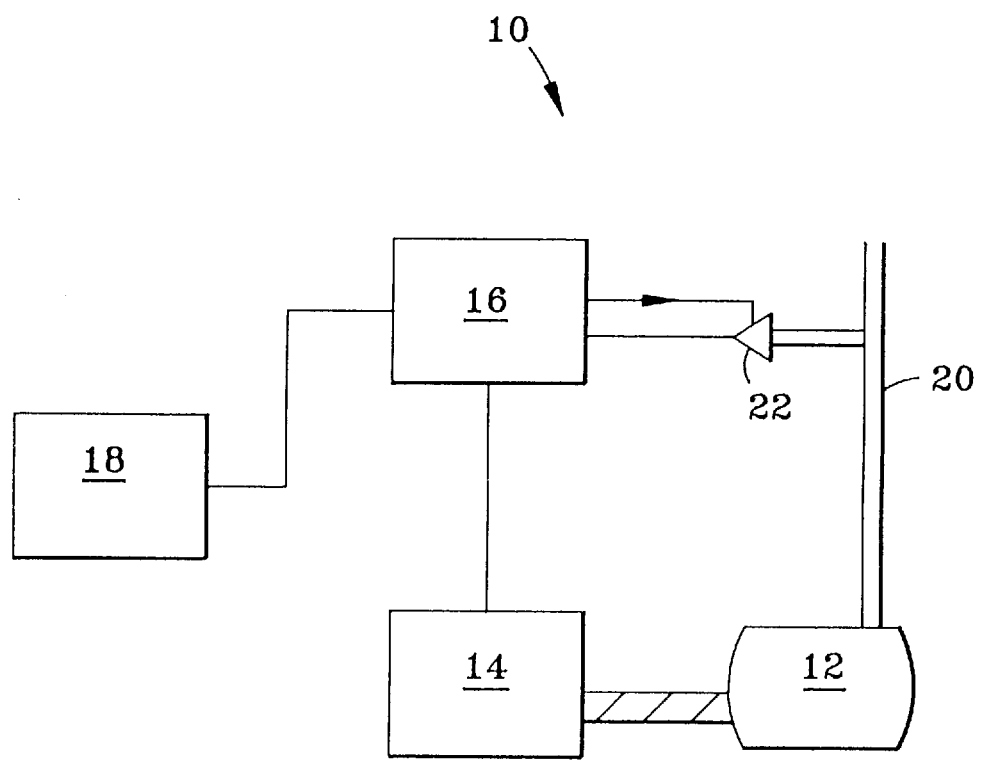

VACUUM CONTROLLER AND METHOD OF CONTROLLING VACUUM IN A DAIRY MILKING SYSTEMS

FIELD OF THE INVENTION

The present invention relates to vacuum control systems and methods of controlling the vacuum in vacuum systems. More particularly, the invention relates to vacuum systems and methods used to regulate the vacuum in dairy milking systems in a manner that increases energy efficiency.

BACKGROUND OF THE INVENTION

Modern dairy milking systems used in dairy farms utilize vacuum for automatically milking the animals. In typical dairy vacuum milking systems, several milking units are attached to the animals with teat cups, and a vacuum is introduced into the milking lines by a vacuum pump, which serves to draw milk from the teats into a storage tank connected to the milking lines. The vacuum pump is driven by a vacuum pump motor which operates at a set voltage and frequency, thereby creating a substantially constant vacuum in the milking lines. Small periodic vacuum variations or "pulsations" are then introduced to effectuate milking.

However, relatively large changes in the vacuum level can occur during the milking operation, such as from one or more milking units being attached to the animal. To this end, most dairy vacuum milking systems employ a mechanical regulator which regulates the vacuum level in the milking lines by introducing enough atmospheric air to maintain vacuum at a given setpoint. This type of system is relatively inefficient because it requires the pump and motor run at full speed and full load throughout the milking, thereby consuming more energy than is actually necessary. In a large dairy farm, the electricity expense attributable to such an inefficient control system is great and can have an impact on the farm's profit margin.

Efforts have been directed toward improving the efficiency of vacuum controllers for dairy milking systems. U.S. Pat. Nos. 5,141,403 and 5,284,180 to Guo et al. (hereinafter, the '403 and '180 patents, respectively) disclose an apparatus and method for controlling vacuum levels in machine milking and other vacuum systems subject to air leakage. The Guo et al. system features an adjustable speed drive ("ASD"), also known as a variable frequency drive ("VFD"). The ASD controls the speed of the vacuum pump motor based on the control signal from a vacuum transducer coupled with the milking system.

Apparently due to unacceptably slow response times from the ASD and related components (the control signal from the vacuum transducer is first interpreted by a computer or microcontroller) available at the time of the Guo et al. invention, the latter includes a dual vacuum system. The dual vacuum system operates in parallel with the ASD. When the vacuum level in the low vacuum milking system drops below a given setpoint, a high vacuum reserve is coupled with the low vacuum system, thereby rapidly making up lost vacuum. At the same time, the ASD is increasing pump motor speed so that as the high vacuum reserve is depleted the vacuum pump will be running fast enough to maintain the vacuum in the high vacuum reserve at setpoint.

As the response time of VFDs and related control apparatus has increased, the need for the dual vacuum system of Guo et al. has apparently diminished. In the article *New Electric Technologies for the Dairy Farm*, by David C. Ludington et al, presented at the National Food and Energy Council Annual Meeting, Jul. 31 and Aug. 1, 1995, Peachtree City, Ga., Ludington et al. describe an improved version of the invention of the '180 and '403 patents that does not use a two-level vacuum. The speed of the vacuum pump motor for the milking system described by Ludington et al. is "controlled directly by the deviation of the actual vacuum level from set point and the rate of change of the vacuum level." *New Electric* at page 3. Because VFDs are conventionally used to control the speed of large electric motors, they "think" in terms of speed or frequency. That is, VFDs are programmed in terms of speed or frequency and use speed or frequency as the setpoint from which deviation is measured. It is apparently for this reason the system described by Ludington et al. was capable of directly controlling motor speed based on deviation between the measured vacuum and the setpoint.

In the article *Vacuum Pumps: Types and Controls*, by David C. Ludington et al., presented at the Designing a Modern Milking Center Conference, December, 1995, Rochester, N.Y., the authors describe a VFD control system similar to the one described in the *New Electric* article. Here too, the authors indicate the speed of the pump, and hence the motor, is "controlled directly by deviation of the actual vacuum level from a set point (milking vacuum)." *Vacuum Pumps* at page 232. In one respect, this statement is apparently self-contradictory. Because, as noted above (and as indicated by its name), VFDs "think" in terms of frequency, direct control of the motor can only be achieved if the setpoint is in frequency. If the setpoint is in vacuum units, then speed of the motor would have to be indirectly controlled as a function of the deviation between the actual vacuum level and the setpoint. Thus, it is believed that, while perhaps not appreciated by the authors, the setpoint of the system described by Ludington et al. in the *Vacuum Pumps* article, and in other similar prior art systems, is actually in frequency units. To summarize, known VFD control systems for milking systems evidently control vacuum in the milk line indirectly as a function of motor speed.

Several problems are believed to exist when vacuum is controlled indirectly as a function of motor speed. First, the VFD must be programmed empirically for each vacuum milking system. This is no small task inasmuch as modern VFDs often have more than 100 programming variables. Such farm-specific programming is required because pump motor slippage and other losses are not directly accounted for when vacuum is indirectly controlled as a function of motor speed. Second, and related to the first problem, signal conditioning of the control signal of the vacuum transducer is often required in addition to farm-specific programming of the VFD. Here too, control problems arising from indirect control of vacuum based on motor speed necessitate such signal conditioning. Third, the cost of such VFD systems is believed to be greater than is necessary due to labor costs associated with programming the VFD for the specific milking system application and due to the need for additional electronics for providing such signal conditioning.

Thus, there is a need for an improved vacuum control system for dairy milking systems that avoids the problems associated with controlling vacuum indirectly as a function of vacuum pump motor speed.

SUMMARY OF THE INVENTION

A first aspect of the present invention is a dairy milking system comprising a line for transporting milk, a vacuum pump motor, a vacuum pump connected to the vacuum pump motor, a vacuum transducer connected to the milking line that generates a control signal which varies as a function of vacuum in the milking line, and a variable frequency drive connected to the transducer and the motor that controls the speed of the motor by recognizing the control signal as representative of vacuum and provides such control by comparing the transducer signal with a setpoint that is representative of vacuum.

A second aspect of the invention is a method of controlling a vacuum in a dairy milking system. The method involves programming the VFD to recognize changes in the control signal provided by the vacuum transducer as representative of changes in vacuum. Next, the output signal is provided to the variable frequency drive. Then, the deviation between the control signal and a setpoint representative of vacuum is determined by the VFD. Finally, the power signal for the motor is generated so that the frequency thereof varies as a function of such deviation.

BRIEF DESCRIPTION OF THE DRAWING

The FIGURE is a schematic diagram of a vacuum control system for a dairy milking system, according to the present invention.

DETAILED DESCRIPTION OF THE INVENTION

The present invention is a vacuum control system for a dairy milking system, and a method of controlling vacuum in such milking system.

The FIGURE is a schematic diagram of dairy milking system 10 which includes the vacuum control system of the present invention. Milking system 10 comprises vacuum pump 12 which is driven by electric vacuum pump motor 14. The latter is electrically connected to VFD 16, which is electrically connected to power supply 18. Pump 12 creates and maintains a vacuum in vacuum milking line 20, which is connected to multiple milking units (not shown).

VFD 16 is a programmable variable frequency drive of the type used to control the speed of electric motors by varying the frequency in the power signal provided to the electric motor. A suitable VFD is manufactured by Magnetek Drives and Systems, Inc. 1655 West Ryerson Road, New Berlin, Wis. 53151, and is identified by model no. GPD-505. Preferably, VFD 16 includes PID (proportional, integral, derivative) circuitry. The manner in which VFD 16 varies the power signal it provides to pump motor 14 is described in more detail below.

System 10 further comprises vacuum transducer 22 which is vacuum coupled with milking line 20 and electrically connected to VFD 16 so that its control signal is provided directly to the VFD. Vacuum transducer 22 draws its excitation voltage from VFD 16. Preferably, transducer 22 shares a common ground (not shown) with VFD 16 so as to eliminate noise in the control system. Transducer 22 provides a control signal that varies as a function of changes in the vacuum in milking line 20. Transducer 22 may be a current output transducer (i.e., changes in vacuum are represented by changes in current) or a voltage output transducer (i.e., changes in vacuum are represented by changes in voltage). In either case, transducer 22 preferably provides a control signal in the voltage or current range VFD 16 is designed to receive. Preferably, the control signal of transducer 22 is linearly proportional across its entire range with changes in vacuum in milking line 20. Thus, the minimum scale of the control signal of transducer 22 is preferably the same in absolute units as the minimum scale programmed in VFD 16, with the same being true for the maximum scale of the control signal relative to the VFD. By following this approach, and for other reasons discussed below, it is possible to avoid the use of intervening electronics between transducer 22 and VFD 16 for powering and conditioning the control signal from transducer 22. This is a distinct advantage over prior art systems featuring such signal conditioning electronics from the perspective of cost and performance.

An important aspect of the present invention is the manner in which VFD 16 is operated to control the speed of vacuum pump motor 14. Briefly, VFD 16 is operated to indirectly control the speed of motor 14 based on deviation between the control signal of vacuum transducer 22, which the VFD is programmed to "think" represents the vacuum in milking line 20, and a setpoint in vacuum units. This is in direct contrast to prior art systems which apparently directly control the speed of the vacuum pump motor based on deviation between the control signal of transducer 22, which the VFD is programmed to "think" represents frequency, and a setpoint in frequency units.

More specifically, VFD 16 is initially programmed to regard the control signal it receives from vacuum transducer 22 as units of vacuum, e.g., inches of mercury (Hg). VFD 16 is also programmed to use a setpoint that also represents units of vacuum, e.g., inches of Hg. The specific setpoint will depend upon various attributes of milking system 10, but typically is about 13-13" of Hg. VFD 16 is additionally programmed to determine the deviation between actual vacuum in milking line 20, as represented by the amplitude of the control signal from transducer 22, and the selected vacuum setpoint. This deviation is then converted by VFD 16 to frequency units (Hz) which the controller uses to increase or decrease the frequency of the power signal provided to vacuum pump motor 14.

For example, if there is a leak in milking line 20 due to application of a milking unit, then the vacuum level in milking line 20 will drop. The vacuum level drop is sensed by vacuum transducer 22, which sends a control signal having an amplitude that is linearly proportional to the new vacuum level directly to VFD 16, preferably without any signal conditioning. VFD 16 calculates the deviation between this vacuum level and the vacuum setpoint and increases the frequency of the power signal sent to vacuum pump motor 14. In response thereto, motor 14 drives vacuum pump 12 faster, thereby restoring the vacuum in milking line 20 to its setpoint value. This process occurs in milliseconds, is continuous during operation, and does not require the use of a high level vacuum reserve of the type used in the '180 and '403 patents. The PID circuitry in VFD 16 ensures changes in frequency are calculated so as to ensure smooth, i.e., non-oscillating, operation of motor 14.

The size of vacuum pump 12 and vacuum pump motor 14 depends on the airflow requirements for the particular milking system. For example, in a double 24 milking system capable of milking 800 cows, one 20 horsepower motor (three phase) and one blower-type vacuum pump were used to create a vacuum of about 13" Hg, a typical vacuum level for a parlor-type milking system. Power supply 18 is typically a standard 208/230 volt single-phase or three-phase power.

In a preferred embodiment, VFD 16 is a Magnetek model no. GPD-505 from Magnetek Drives and Systems, Inc., 16555 West Ryerson Rd., New Berlin, Wis. 53151, which can operate on single-phase or three-phase power from power supply 18. Vacuum transducer 22 is a current output Omega transducer model no. PX605-30VACGI, from Omega Engineering, Inc., One Omega Drive, Stamford, Conn. 06907, which has an output in the range of 4 milliamps to 20 milliamps. The Magnetek VFD is capable of accepting a current signal in the range of 4 milliamps to 20 milliamps. The Magnetek VFD is programmed to associate a 4 milliamp current with vacuum level of 0" Hg and a 20 milliamp current with a vacuum level of 30" Hg. The current signal from transducer 22 is fed directly into the Magnetek VFD, which is programmed to accept vacuum units in full scale. As noted above, transducer 22 also receives its excitation voltage directly from VFD 16.

An important advantage of the present invention is that no frequency calibration of VFD 16 to account for variables in milking system 10, such as motor slip due to load and vacuum pump characteristics, is required. In other words, no farm-specific programming of VFD 20 relative to variables affecting motor speed is required. This is significant because modern VFDs, such as the Magnetek GPD-505, include a significant number of programming parameters (108 such parameters for the GPD-505). Changes in the vacuum setpoint are achieved by changing only one of the programming parameters.

By contrast, prior art systems that control motor speed directly by comparing the control signal from the vacuum transducer with a setpoint in frequency units, are forced to deal with variables in the milking system that affect motor speed. Such variables are handled through the use of electronics that condition the control signal of the vacuum transducer, and by farm-specific, iterative programming of the VFD relative to variables in the farm's milking system affecting motor speed. In addition to the added cost of conditioning the signal with various electronics, farm-specific programming of the VFD can be a time-consuming, and hence expensive, proposition.

Another advantage of the present invention is that a separate digital readout for displaying vacuum level in milking line 20 is not required. The digital readout that is typically a part of the VFD may be used to represent the vacuum in milking line 20, insofar as the VFD "thinks" of the signal it receives from transducer 22 as representative of vacuum. Prior art systems, in which the VFD is not programmed in accordance with the principles of the present invention described above, are typically forced to use a separate digital readout which adds to the cost of the system. The latter indicates vacuum in the milking line based on the output of the system's vacuum transducer.

While the present invention has been described in connection with the preferred embodiments, it will be understood that it is not limited to those embodiments, but rather is intended to cover all alternatives, modifications, and equivalents as may be included within the spirit and scope of the invention as described herein.

What is claimed is:

1. A dairy milking system comprising:
   a) a milking line for transporting milk;
   b) a vacuum pump motor;
   c) a vacuum pump connected to said vacuum pump motor;
   d) a vacuum transducer is connected to said milking line and provides a signal that varies as a function of vacuum in said milking line; and
   e) a variable frequency drive connected to said transducer and said motor that controls the speed of said motor by recognizing said signal as representative of vacuum and provides such control by comparing said signal with a setpoint that is representative of vacuum.

2. A system according to claim 1, wherein said variable frequency drive converts the result of said comparing in step e) into units representative of frequency.

3. A system according to claim 1, wherein said signal provided by said transducer indicates changes in vacuum in said milking line by changes in current.

4. A system according to claim 1, wherein said signal provided by said transducer indicates changes in vacuum in said milking line by changes in voltage.

5. A control system for regulating the vacuum in a dairy milking system having a milking line and a vacuum pump attached to the milking line for creating a vacuum therein, the control system comprising:
   a) a vacuum transducer is connected to the milking line and provides a signal that varies as a function of changes in vacuum in the milking line;
   b) an electric motor connected to the vacuum pump; and
   c) a variable frequency drive connected to said transducer and said motor that controls the speed of said motor by recognizing said signal as representative of vacuum and provides such control by comparing said signal with a setpoint that is representative of vacuum.

6. A control system according to claim 5, wherein said signal is provided directly to said variable frequency drive without any intervening signal conditioning.

7. A control system according to claim 5, wherein said signal indicates changes in vacuum in said milking line by changes in current.

8. A control system according to claim 5, wherein said signal indicates changes in vacuum in said milking line by changes in voltage.

9. A method of controlling the vacuum in a vacuum dairy milking system including a vacuum milking line, a vacuum pump for providing a vacuum in the milking line, an electric motor for driving the vacuum pump, a vacuum transducer coupled with the milking line for providing a control signal that varies as a function of changes in vacuum in the milking line and a variable frequency drive for generating a power signal for controlling the speed of the electric motor, the method comprising the steps of:
   a) programming the variable frequency drive to recognize changes in the control signal provided by the vacuum transducer as representative of changes in vacuum;
   b) providing the control signal to the variable frequency drive;
   c) determining the deviation between the control signal and a setpoint representative of vacuum; and
   d) generating the power signal so that the frequency thereof varies as a function of said deviation.

10. A method according to claim 9, further comprising the step of:
   e) providing the power signal to the electric motor.

11. A method according to claim 9, wherein said step b involves providing the control signal so that changes in vacuum are indicated by changes in current.

12. A method according to claim 9, wherein said step b involves providing the control signal so that changes in vacuum are indicated by changes in voltage.

13. A method according to claim 9, wherein said step b involves providing the control signal directly from the vacuum transducer to the variable frequency drive without any intervening signal conditioning.

14. A method of controlling a vacuum system including a vacuum line and an electric motor, the method comprising the steps of:
   a) measuring changes in vacuum in the vacuum line; and
   b) providing a power signal to the electric motor, the frequency of which is determined indirectly as a function of deviation between vacuum measured in said step a and a setpoint representative of vacuum.

15. A method according to claim 14, wherein said step a involves measuring said changes in a vacuum line used in a vacuum milking system.

* * * * *